O. K. PURDY.
RESILIENT TIRE.
APPLICATION FILED APR. 17, 1916.
1,232,971.
Patented July 10, 1917.
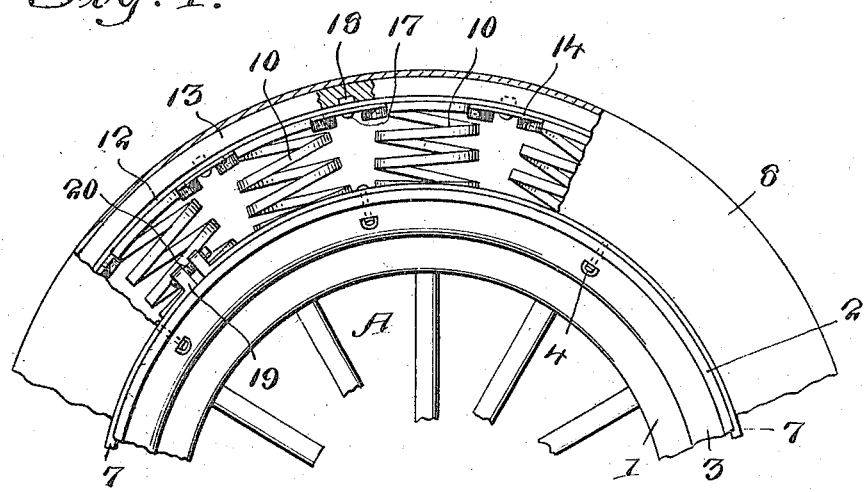
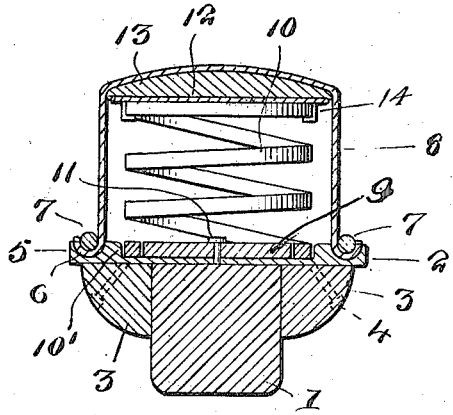
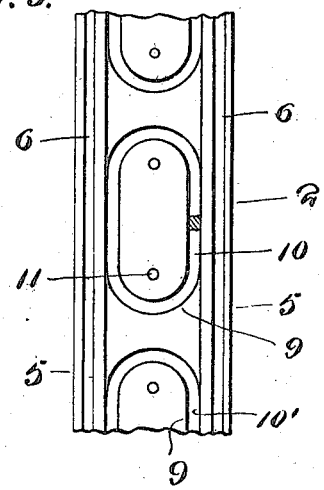
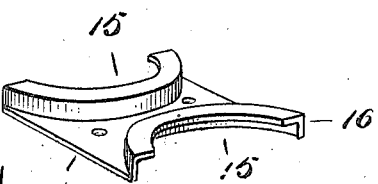
Inventor
O. K. Purdy
By Victor J. Evans
Attorney
Witnesses

UNITED STATES PATENT OFFICE.

ORANGE K. PURDY, OF PRESCOTT, WASHINGTON.

RESILIENT TIRE.

1,232,971.  Specification of Letters Patent.  Patented July 10, 1917.

Application filed April 17, 1916. Serial No. 91,824.

*To all whom it may concern:*

Be it known that I, ORANGE K. PURDY, a citizen of the United States, residing at Prescott, in the county of Walla Walla and State of Washington, have invented new and useful Improvements in Resilient Tires, of which the following is a specification.

This invention relates to resilient tires, the object of the invention being to produce a mechanically resilient tire as a substitute for the ordinary pneumatic tire now in common use, thereby increasing the life and durability of the tire without decreasing the resiliency provided by the ordinary pneumatic tire.

A further object of the invention is to provide in connection with a fixed rim and a resilient rim having a resilient tread mounted thereon, a novel arrangement of springs so constructed and of such formation and relation to the fixed and resilient rims that the resilient rim is effectively braced and any load imposed thereon is distributed upon and absorbed by several of the springs interposed between the fixed and movable rims.

With the above and other objects in view, the invention consists in the novel construction, combination and arrangement of parts, as herein described, illustrated and claimed.

In the accompanying drawings:—

Figure 1 is a fragmentary side elevation partly in section of a vehicle wheel showing the tire of this invention.

Fig. 2 is a cross section through the same on an enlarged scale.

Fig. 3 is a fragmentary outer face view of the fixed rim, showing portions of the springs.

Fig. 4 is a detail perspective view of one of the spring clamps.

Referring to the drawings A designates generally a vehicle wheel comprising a felly 1 and a relatively fixed rim 2 which encircles and bears upon the felly 1. The rim 2 is wider than the felly 1 and the angles between said members are filled by means of annular stops 3 each quadrant-shaped in cross section, said stops being fastened to the fixed rim 2 by means of bolts 4 or the equivalent thereof. The bolts 4 are preferably arranged between the springs hereinafter described and as shown in Fig. 1.

The rim 2 is provided along the opposite margins of the outer face thereof with outwardly extending flanges 5, the same being formed with concaved seats or grooves 6 to receive clamping rings 7, the latter serving to firmly clamp in fixed relation to the rim 2 the inner margins of a flexible outer casing 8. This casing 8 incloses the resilient structure hereinafter described.

The fixed rim 2 is provided on the outer face thereof with spring holding bosses 9 oblong in shape and having their major axes arranged lengthwise of the rim 2, each of said bosses 9 forming holding or positioning means for the inner end of a correspondingly shaped spring 10. As shown, the bosses 9 are formed separately from the rim 2 and secured thereto by fasteners 11 but it will of course be apparent that the said bosses may be formed integrally with the rim 2 if so desired. The inner walls of the flanges 5 also serve as retaining means for the springs 10, the straight side portions 10' of which lie between the bosses 9 and said flanges 5.

The resilient tire supporting rim 12 is normally concentric with the fixed rim 2 but is adapted to flex when a load is imposed thereon. Fixedly secured to the outer face of the rim 12 is a resilient tread 13 preferably of solid rubber, the same being contained within and surrounded and protected by the flexible casing 8 which, as shown, extends entirely around the tread, inclosing the same and also housing in the resilient rim 12, the inner rim 2 and the springs 10.

In order to detachably fasten the outer convolutions of the springs 10 to the inner face of the resilient rim 12 I employ in connection with each pair of springs a spring clamp 14 which extends transversely of the inner face of the rim 12 and has oppositely concaved edges 15 against which the adjacent springs 10 bear, the clamp 14 being provided along its concaved or curved edges with correspondingly curved flanges 16 which extend under the adjacent portions of the springs 10 and firmly clamp the same against the inner face of the rim 12. Each spring clamp 14 is fastened to the rim 12 by one or more bolts 17 having their heads disposed inwardly and their outer end portions threaded to receive nuts 18 which are received in recesses in the tread 13 thereby acting to prevent either longitudinal or lateral creeping of the tread in relation to the rim 12.

Each of the clamping rings 7 is split as shown in Fig. 1 and formed with terminal lugs 19 through which is inserted a clamping screw 20, enabling the ends of each ring to be drawn together so that the ring will tightly clamp the adjacent margin of the flexible casing 8 in the grooved seat of the fixed rim 2.

By reason of the construction hereinabove described, a tire is produced, the resiliency of which is afforded by the three elements which mutually contribute toward that end, said elements consisting of the resilient rim 12 which is preferably formed of spring steel, the rubber tread 13, and the springs 10. All of these resilient members are housed within the flexible casing 8. A broken spring may be replaced by loosening one of the clamping rings 7 which releases one side margin of the outer casing. This exposes the springs to view. Then by loosening or removing two of the spring clamps from the resilient rim 12, the broken spring may be removed. To substitute a new spring in place thereof, the same may be compressed by means of a suitable implement such as a pair of tongs made specially for the purpose, the spring while compressed being inserted in place so that the lower end thereof will snap over the spring holding boss 9. The spring clamps 14 may then be returned to their places and fastened to the rim 12.

The construction hereinabove described provides for durability, simplicity and cheapness of manufacture and eliminates the troubles incident to the use of pneumatic tires. It will of course be understood that the springs and the resilient rim and other parts may be varied as to their strength and general dimensions in accordance with the weight of the vehicle and the load to be imposed thereon. These and other changes in the form proportion and minor details of construction may be resorted to without departing from the principle or sacrificing any of the advantages of the invention.

I claim:

The combination of a fixed rim, a resilient rim encircling the fixed rim in spaced normally concentric relation thereto, helical springs interposed between said rims, spring clamps fastened to the inner face of said resilient rim, each of said clamps being interposed between two adjacent springs and being formed with reversely curved opposite portions having correspondingly curved flanges which extend under the adjacent portions of the outer convolutions of said adjacent springs, and means for holding the inner convolutions of said springs in a predetermined relation to the fixed rim.

In testimony whereof I affix my signature.

ORANGE K. PURDY.

Copies of this patent may be obtained for five cents each, by addressing the "Commissioner of Patents, Washington, D. C."